(No Model.)
F. LAUFKOTTER.
Safety-Stop for Elevators.
No. 227,799. Patented May 18, 1880.
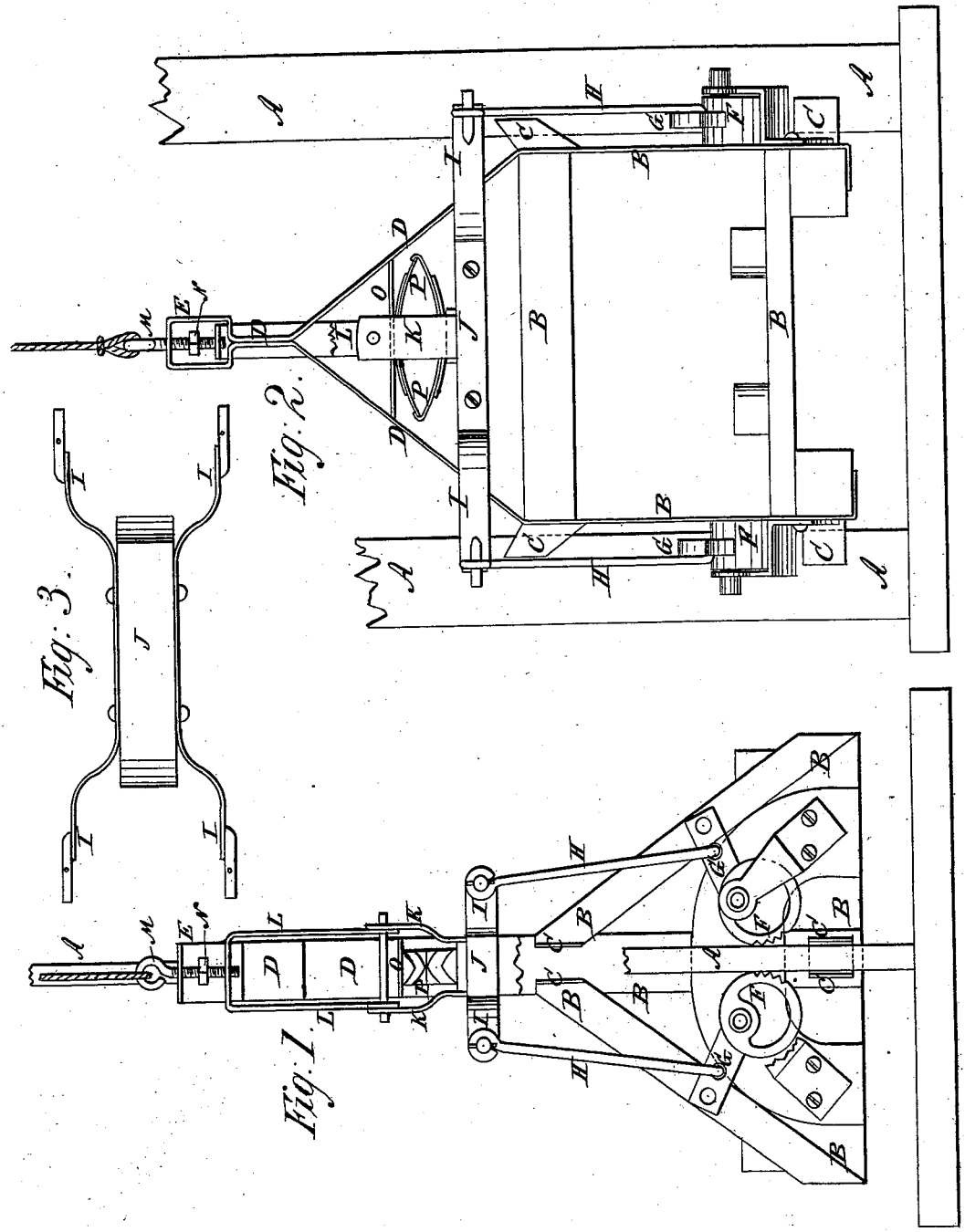
WITNESSES:
A. Schehl.
C. Sedgwick
INVENTOR:
F. Laufkotter
BY Munn & Co.
ATTORNEYS.

UNITED STATES PATENT OFFICE.

FRANK LAUFKOTTER, OF COLLINSVILLE, ILLINOIS.

SAFETY-STOP FOR ELEVATORS.

SPECIFICATION forming part of Letters Patent No. 227,799, dated May 18, 1880.

Application filed March 11, 1880. (No model.)

*To all whom it may concern:*

Be it known that I, FRANK LAUFKOTTER, of Collinsville, in the county of Madison and State of Illinois, have invented a new and useful Improvement in Safety-Stops for Elevators, of which the following is a specification.

Figure 1 is a side elevation of the improvement, part being broken away. Fig. 2 is a front elevation, part being broken away. Fig. 3 is a plan view of the suspended cross-bar and its arms.

Similar letters of reference indicate corresponding parts.

The object of this invention is to furnish safety-stops for elevators for buildings, mine-shafts, and other purposes, so constructed as to stop the elevator-cage and hold it securely should the hoisting-rope break.

A represents the ordinary guide-bars of an elevator, upon which the cage B moves up and down, the said cage being kept in place by guards C, attached to it, and which project upon the opposite sides of the said guides A.

To the ends of the top cross-bar of the cage B are attached two bars, D, which may be the upward extension of the side frames of the cage B. The bars D incline inward till they meet, then pass up together, and have a loop, E, formed upon their upper ends.

The bars D may be formed in one piece, if desired, and may be made with an arch or curve.

To the sides of the cage B, upon the opposite sides of the guides A, are pivoted eccentric wheels F, in such positions that they may be turned against the said guides to clamp them, and thus stop the descent of the cage B.

To the eccentric wheels F are rigidly attached, or upon them are formed, arms G, to the outer ends of which are pivoted the lower ends of rods H. The upper ends of the rods H are pivoted to the ends of the arms I, formed upon or attached to the cross-bar J.

The arms I are curved, as shown in Fig. 3, to bring their outer ends into proper position to receive the upper ends of the rods H. The cross-bar J is placed above and at a little distance from the top cross-bar of the cage B.

To the opposite sides of the center of the cross-bar J are attached the lower ends of two bars, K, the upper ends of which are connected by a bolt with the ends of a U-bar, L, the bend of which passes through the loop E of the bars D.

To the bend of the bar L is attached the end of a rod, M, which passes up through the top of the loop E, and has an eye formed upon its upper end to receive the end of the hoisting rope or chain.

Upon the rod M, between the bend of the bar L and the top of the loop E, is placed a nut or collar, N.

Between the cross-bar J and a cross-bar, O, attached to the inclined bars D, is interposed a spring, P, as shown in Fig. 2.

With this construction, when power is applied to the hoisting mechanism, the first effect is to compress the spring P and turn the eccentric wheels F away from the guides A. The nut or collar N then comes in contact with the top of the loop E and raises the cage B. Should the hoisting rope or chain or any other part of the hoisting mechanism break while the cage B is moving up or down the removal of the strain from the rod M allows the spring P to throw the bar J downward, turning the eccentric wheels F against the sides of the guides A, and holding them pressed against the said guides, so as to stop the descent of the cage and hold it securely until power is again applied to the rod M to again turn back the eccentric wheels F.

Having thus fully described my invention, I claim as new and desire to secure by Letters Patent—

The combination, with the cage B, of the inwardly-inclined loop-bars E D, the eccentric wheels F, having arms G, the pivoted rods H, the arms I, the cross-bar J, the bars K, the U-bar L, the rod M, having collar N, the cross-bar O, and the spring P, as and for the purpose specified.

FRANK LAUFKOTTER.

Witnesses:
  A. F. HOFFEY,
  S. M. COX.